United States Patent Office 3,433,802
Patented Mar. 18, 1969

3,433,802
3-(N-LOWER-ALKYLANILINO)PYRROLIDINES
Norman D. Dawson, Richmond, and Albert D. Cale, Jr., Mechanicsville, Va., assignors to A. H. Robins Company, Incorporated, Richmond, Va., a corporation of Virginia
No Drawing. Continuation-in-part of application Ser. No. 536,291, Mar. 22, 1966. This application June 25, 1968, Ser. No. 739,668
U.S. Cl. 260—326.5
Int. Cl. C07d 27/04
7 Claims

ABSTRACT OF THE DISCLOSURE 3-(N-lower-alkylanilino)pyrrolidines, useful intermediates in preparing useful pharmacologically active indole compounds.

---

This application is a continuation-in-part of our prior-filed copending application Ser. No. 536,291, filed Mar. 22, 1966, now abandoned.

The present invention relates to heterocyclic organic compounds which may be referred to as 3-anilinopyrrolidines, more particularly 3-(N - lower - alkylanilino)pyrrolidines.

The invention is concerned with compounds of the formula:

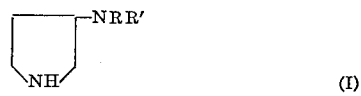

wherein R is lower-alkyl, and wherein R' is selected from the group consisting of phenyl, lower-alkylphenyl, lower-alkoxyphenyl, halophenyl and trifluoromethylphenyl, and acid addition salts thereof.

These compounds are useful intermediates in the preparation of indole compounds which are useful in the treatment of spasm, including the reduction of tremors and muscular rigidity of Parkinsonism. To obtain these highly useful indole compounds, a compound of the present invention is reacted with an indole-3-glyoxyloyl chloride to produce a 1-(indol-3-yl glyoxyloyl)-3-N-lower-alkylanilinopyrrolidine, which is then reduced, as with lithium aluminum hydride in tetrahydrofuran, to give the desired pharmacologically active 3-[2-(3-N-lower-alkyl-anilinopyrrolidinyl)ethyl]indole product, preferably in the form of an acid addition salt thereof. The present compounds may also be used as substitute for phenyl piperazines in certain process applications.

It is accordingly an object of the present invention to provide new and useful 3-(N-lower-alkylanilino)pyrrolidines. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, sec. butyl, tertiary butyl, amyl, isoamyl, hexyl, heptyl, octyl, and the like. "Lower-alkoxy" has the formula —O-lower-alkyl.

Among the suitable radicals within the scope of R' are phenyl radicals either unsubstituted or substituted by any radical or radicals which are not reactive or otherwise interfering under the conditions of reaction such as lower-alkoxy, lower-alkyl, trifluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl and lower-alkoxy substituents each have preferably one to four carbon atoms which can be arranged as straight or branched chains.

The compounds of Formula I may be converted to and are conveniently stored and frequently employed in the form of acid addition salts. Such salts also have improved water-solubility. When used as intermediates for pharmaceutical products the non-toxic salts are preferred, but any salt may be prepared and used as a chemical intermediate. The free basic compounds of Formula I may be conveniently converted to their acid addition salts by reaction of the free base with the selected acid, preferably in the presence of an organic solvent inert to the reactants and reaction products under the conditions of the reaction.

Appropriate acid addition salts are those derived from mineral acids such as hydrochloric acid, hydrobromic acid, hydroiodic acid, nitric acid, sulfuric acid, sulfamic acid, and phosphoric acid; and organic acids such as acetic acid, citric acid, lactic acid, fumaric acid, and tartaric acid.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

In a preferred method, for preparing the novel compounds of the invention, an N-lower-alkylaniline or N-lower-alkyl substituted aniline is reacted with maleimide, preferably in equimolar amounts. The product is further reacted with lithium aluminum hydride in an aprotic solvent, preferably with heating, as at reflux, and the product subsequently isolated as by distillation to give the desired compound of the invention. The free base may be subsequently converted to the acid salt, as by reaction with hydrochloric acid. The method may be illustrated as follows:

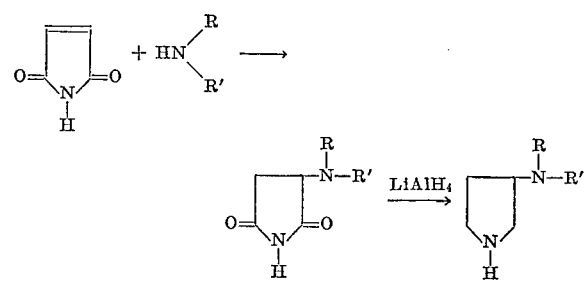

In an alternative method, a suitable 1-benzyl-3-(N-lower-alkylanilino)pyrrolidine, such as 1-benzyl - 3 - (N-methylanilino)pyrrolidine, is debenzylated by hydrogenolysis to produce the desired 1-unsubstituted pyrrolidine compound. For example, the selected 1-benzyl starting material is dissolved in a suitable aprotic solvent such as ethanol containing palladium on charcoal catalyst. The solution is shaken in a Parr hydrogenation apparatus at an initial hydrogen pressure of about 50 p.s.i. After the uptake of hydrogen ceases, the mixture is filtered, the ethanol or other solvent stripped, and the residual oil distilled in vacuo. This procedure is generally suitable except where the anilino group contains a halogen ring substituent.

The following preparations and examples are given by way of illustration only and are not to be construed as limiting.

EXAMPLE 1.—3-(N-METHYLANILINO) PYRROLIDINE

Preparation A

N-carbamoylmaleamic acid: Maleic anhydride (500 gms., 5.10 moles) and 300 gms. (5.0 moles) of urea was mixed with 1000 gms. of glacial acetic acid. The solution was heated for fifteen hours at 50° C. After 24 hours at room temperature the separated solid was collected, washed with 125 ml. of acetic acid and dried in a vacuum oven at 50° C. The yield was 391 gms. (49.5%); M.P. 156–159° C.

N-carbamoylmaleimide: Acetic anhydride (900 ml.) was stirred magnetically and heated to 90 C. N-carbamoylmaleamic acid was added in portions. After the last portion had been added the pot temperature was raised to 97–102° C. for ¾ hour. The hot solution was gravity filtered, the filtrate thoroughly chilled, and the product collected and dried in a vacuum oven. Yield=196.0 gms. (69.2%); M.P. 156–160° C.

Maleimide: Five hundred gms. (3.56 moles) of N-carbamoylmaleimide was added in portions to 1.0 kg. of dimethylformamide at 90–95° C. with stirring. After addition of the solid was complete, the reaction mixture was stirred for 1.5 hours at 90–95° C. The cooled mixture (20° C.) was stirred for two hours and filtered free of cyanuric acid. The filtrate was concentrated using water pump vacuum and the residue distilled rapidly at oil pump vacuum to give 183 gms. (53%) of crude maleimide melting at 84–93° C. The crude maleimidie was crystallized from ethyl acetate to give 159 gms. (46%) of maleimide melting at 90–93° C.

EXAMPLE 1A.—N-METHYL-N-PHENYL-ASPARTIMIDE

Maleimide (286.4 gms., 2.95 moles) and 326 gms. (2.95 moles) of N-methylaniline (97% assay) were mixed and heated for 3.5 hours at a pot temperature of 150–160° C. When the pot temperature dropped to 120° C., isopropanol was slowly stirred into the mixture to precipitate the product in a finely divided state. The weight of the dried crude product was 377 gms. (62.8%). The crude material was recrystallized from six liters of boiling isopropanol to give 303 gms. (50.5%) of white crystalline material melting at 161–164° C.

3 - (N - ethylanilino)pyrrolidine: N-methyl-N-phenyl-aspartimide (40.8 gms.; 0.20 mole) was added in portions to a well-stirred slurry of 16.4 gms. (0.43 mole) of lithium aluminum hydride and 250 ml. of dry ether. The stirred mixture was refluxed for two hours, cooled, 200 ml. of dry tetrahydrofuran and 5 gms. of lithium aluminum hydride added; and refluxing resumed for 3.5 hours. The reaction mixture was quenched with water, and the organic layer separated, dried and concentrated to an oil. The oil was distilled to give 17.4 gms. (49.5%) of colorless material; B.P. 101–102° C./0.10 mm.

Preparation B p-Methylbenzene sulfonate ester of 1-benzyl-3-pyrrolidinol: 1-benzyl-3-pyrrolidinol (354 g., 2.0 moles) was added dropwise to a stirred suspension of 78 g. (2.0 moles) of sodamide in one liter of dry toluene. The rate of addition was adjusted to maintain a pot temperature of 35° C. After stirring for one hour, a solution of 381 g. (2.0 moles) of p-methylbenzene sulfonyl chloride in 2.5 liters of dry toluene was added, keeping the pot temperature below 30° C. by using an ice bath. The reaction mixture was stirred for 2.5 hours and 500 ml. of water added carefully to decompose unreacted sodamide. The mixture was washed two times with one-liter portions of water, the organic layer separated, dried over sodium sulfate, filtered, and the volume of the filtrate adjusted to three liters.

1-benzyl-3-(N-methylanilino)pyrrolidine: 300 ml. of a toluene solution of the p-methylbenzene sulfonate ester of 1-benzyl-3-pyrrolidinol (ca. 0.2 mole of sulfonate ester) was concentrated on a rotary evaporator. The residue was mixed with 150 ml. of N-methylaniline. The mixture was heated for 1.5 hours at 120–140° C. and then for two hours at 180° C. The cooled mixture was partitioned between 200 ml. of dilute sodium hydroxide and 200 ml. of toluene. The toluene layer was dried over sodium sulfate, filtered, and concentrated using a water pump. Distillation of the oily residue gave 30 g. of 1-benzyl-3-(N-methylanilino)pyrrolidine having a boiling point of 170–185° C. at 0.01 mm.

EXAMPLE 1B.—3-(N-METHYLANILINO) PYRROLIDINE 1-benzyl-3-(N-methylanilino)pyrrolidine (92 g.; 0.345 mole) in 750 ml. of ethanol containing 3 g. of 10% palladium on charcoal is shaken at 55° C. in a hydrogen atmosphere. An additional 3 gms. of 10% palladium on charcoal is added. The solution is acidified with concentrated HCl and hydrogen is taken up at a moderate rate of about 4.5 liters per 6 hours. The reaction is allowed to stand overnight, 3 additional grams of catalyst added, and the reactants shaken for an additional fifteen hours.

The reaction product is filtered, concentrated, and partitioned between 400 ml. of dilute sodium hydroxide and 200 ml. of benzene. The benzene solution is dried over $Na_2SO_4$, concentrated and distilled to give the desired product. Yield=39 gms. (64%), B.P. 108–112° C./ 0.2 mm.

Related starting materials and products having different N-lower-alkyl (R) groups and substituted phenyl (R') radicals are prepared in the same manner by employing the selected starting N-lower-alkylaniline compound in the first step of Example 1A or in the second step of Preparation B.

EXAMPLE 2.—3-(N-ETHYL-4-METHYLANILINO)-PYRROLIDINE

Utilizing the method of Example 1, equimolar amounts of N-ethyl-4-methylaniline and maleimide are mixed and reacted together. The resulting product is reduced in ethyl ether-tetrahydrofuran solvent using lithium aluminum hydride to give 3-(N-ethyl-4-methylanilino)pyrrolidine.

EXAMPLE 3.—3-(N-ISOPROPYL-4-METHOXY-ANILINO)PYRROLIDINE

Utilizing the method of Example 1, equimolar amounts of N-isopropyl-4-methoxyaniline and maleimide are mixed and reacted together and the resulting product subsequently reduced in ethyl ether-tetrahydrofuran solution containing lithium aluminum hydride to give 3-(N-isopropyl-4-methoxyanilino)pyrrolidine.

EXAMPLE 4.—3-(N-BUTYL-3-CHLOROANILINO)-PYRROLIDINE

Utilizing the method of Example 1, equimolar proportions of N-butyl-3-chloroaniline and maleimide are mixed and reacted together, and the reaction product subsequently reduced in ethyl ether-tetrahydrofuran solution containing lithium aluminum hydride to give 3-(N-butyl-3-chloroanilino)pyrrolidine.

EXAMPLE 5.—3-(N-METHYL-4-TRIFLUOROMETH-YLANILINO)PYRROLIDINE

Utilizing the method of Example 1, equimolar proportions of N-methyl-4-trifluoromethylaniline and maleimide are mixed and reacted together, and the reaction product subsequently reduced in ethyl ether-tetrahydrofuran solution containing lithium aluminum hydride to give 3-(N-methyl-4-trifluoromethylanilino)pyrrolidine.

EXAMPLE 6.—3-(N-METHYLANILINO)PYRROLIDINE 1-benzyl-3-(N-methylanilino)pyrrolidine (53.2 g.; 0.20 mole) was dissolved in 200 ml. of ethanol containing 3 g. of 10% palladium on charcoal catalyst. The mixture was shaken in a Par hylrogenation apparatus at an initial hydrogen pressure of 50 p.s.i. After the uptake of hydrogen ceased the mixture was filtered, the ethanol stripped, and the residual oil distilled in vacuo. 27.4 g. (70%) of 3-(N-methylanilino)pyrrolidine was collected at 100–103° C./0.1 mm.

We claim:

1. A compound selected from the group consisting of 3-anilinopyrrolidines having the formula:

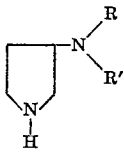

wherein R is lower-alkyl, and
wherein R' is selected from the group consisting of phenyl, lower-alkylphenyl, lower-alkoxyphenyl, halophenyl, and trifluoromethylphenyl, and acid addition salts thereof.

2. A compound of claim 1 which is a 3-(N-lower-alkylanilino)pyrrolidine.

3. 3-(N-methylanilino)pyrrolidine.

4. A compound of claim 1 which is a 3-(N-lower-alkylmethylanilino)pyrrolidine.

5. A compound of claim 1 which is a 3-(N-lower-alkylmethoxyanilino)pyrrolidine.

6. A compound of claim 1 which is a 3-(N-lower-alkylhaloanilino)pyrrolidine.

7. A compound of claim 1 which is a 3-(N-lower-alkyltrifluoromethylanilino)pyrrolidine.

No references cited.

ALEX MAZEL, *Primary Examiner.*

JOSE TOVAR, *Assistant Examiner.*

U.S. Cl. X.R.

260—326.85; 424—274